Sept. 3, 1940.  C. P. GRIFFITH  2,213,857
PUMPING AND SEPARATING MECHANISM
Filed Sept. 8, 1937   2 Sheets-Sheet 1
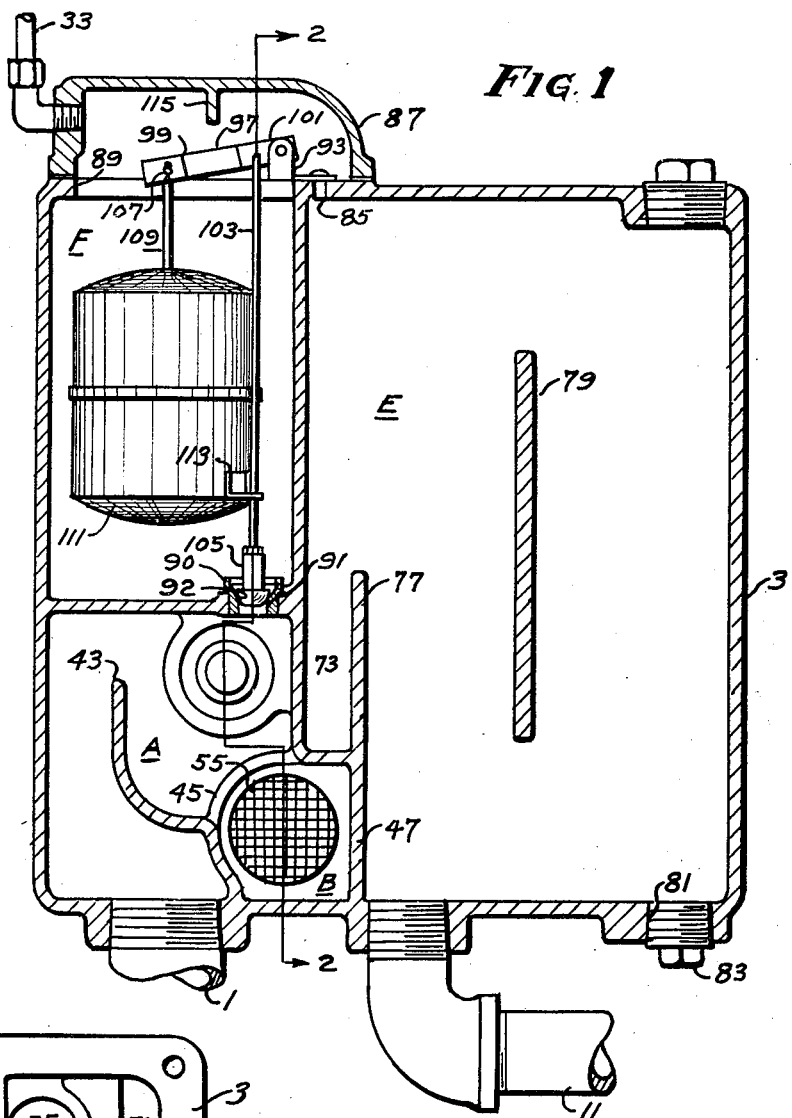
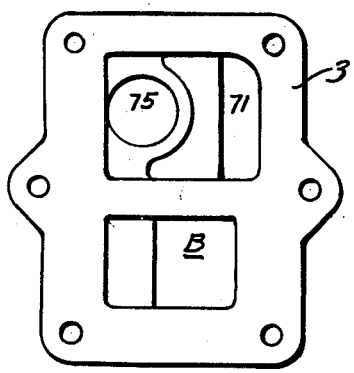
Clement P. Griffith
INVENTOR.
BY Edmund W. C. Kamm
ATTORNEY.

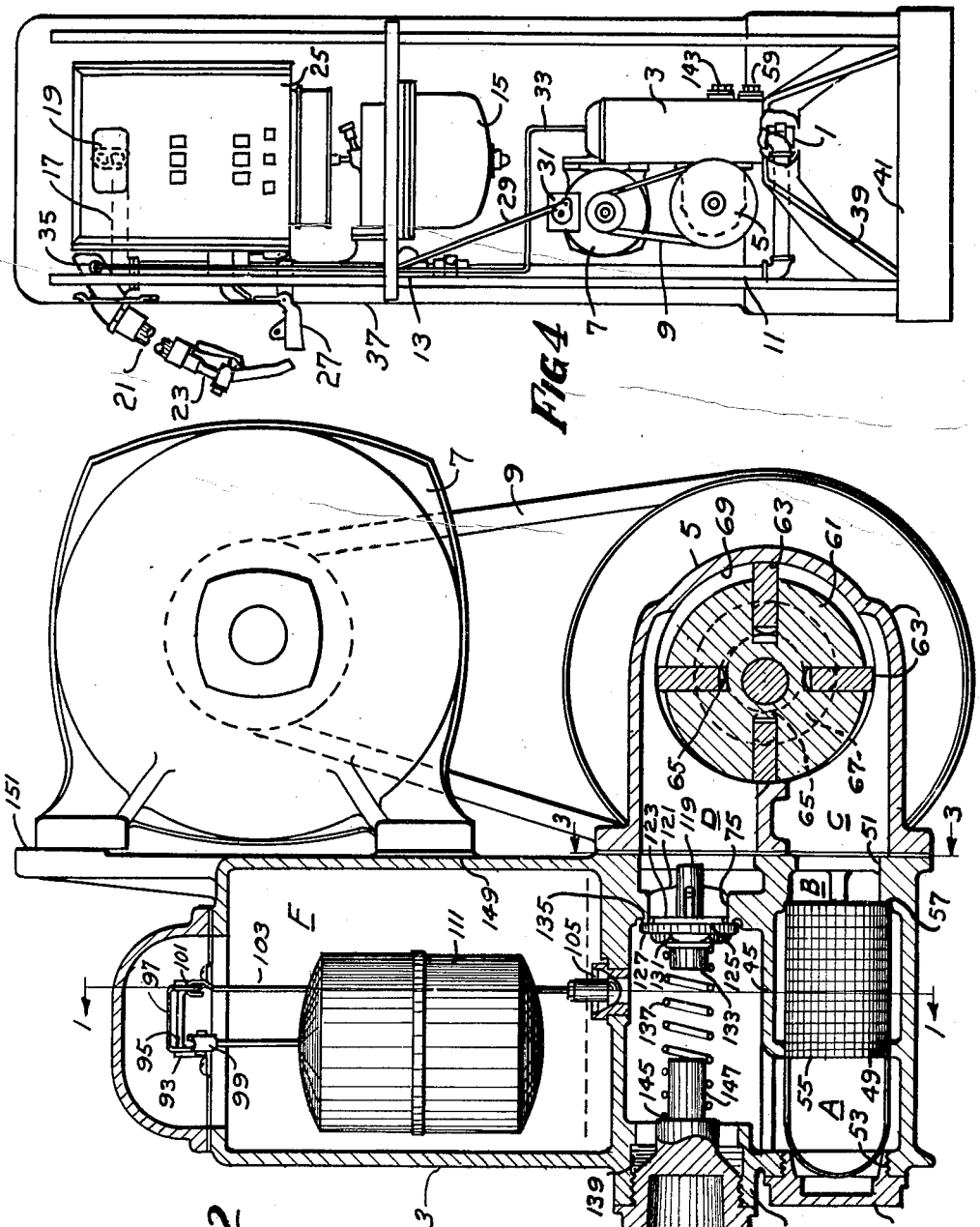

Patented Sept. 3, 1940

2,213,857

UNITED STATES PATENT OFFICE 2,213,857

PUMPING AND SEPARATING MECHANISM

Clement P. Griffith, Fort Wayne, Ind., assignor to S. F. Bowser & Company, Incorporated, Fort Wayne, Ind., a corporation of Indiana Application September 8, 1937, Serial No. 162,946

3 Claims. (Cl. 137—68)

The invention of this application relates to air separators but more especially to separators which are used on the well known service station gasoline dispensing apparatus for removing air and vapors from the liquid being dispensed in advance of the meter so that only solid liquid will pass through the latter. Most positive displacement meters will measure gases as well as liquid, hence it is necessary to remove such gases in advance of the meter to insure correct measurement.

An object of the invention is to provide a compact separating and pumping assembly.

Another object is to provide a novel by-pass valve and screening arrangement.

Yet another object of the invention is to provide a novel by-pass valve.

Still another object of the invention is to provide an arrangement whereby the pump will remain primed for operation after a shut down.

A further object of the invention is to provide a separator which can be cheaply constructed.

Yet another object is to provide a by-pass valve arrangement which will be free acting and which will operate with a minimum of noise.

Still another object is to provide a separation chamber having baffles arranged to afford a maximum separation of air.

Other objects will appear from a consideration of the specification when considered in connection with the drawings which form a part thereof and in which Figure 1 represents a vertical section of the separator, showing the various chambers and taken on the line 1—1 of Figure 2.

Figure 2 is a vertical section of the separator taken on the line 2—2 of Figure 1 and showing the pump, by-pass valve and other parts of the apparatus.

Figure 3 is a partial elevation showing the arrangement of the parts of the separator as they appear when viewed from line 3—3 of Figure 2.

Figure 4 is an elevation showing the arrangement of the separator assembly in a dispensing apparatus.

Referring to the general assembly shown in Figure 4, a suction stub 1 is connected to an underground reservoir by a pipe not shown and forms a conduit which leads to the interior of the separator body 3. The pump 5 which is driven by an electric motor 7 through a belt 9 lifts the liquid from the reservoir and discharges it into the separating chamber of the separator, later to be described, and forces it through conduit 11 through a combined check and relief valve 13 to a meter 15 which is preferably a displacement meter of the type disclosed in the patent to Blum, 1,977,424.

From the meter, liquid passes through a conduit 17, a sight glass and indicator 19 and thence through the hose 21 and nozzle 23 into the purchaser's receptacle which is not shown.

A register 25 of any suitable type such as a volume register or a computing register is driven by the meter so that the gallons dispensed or the cost thereof may readily be ascertained.

A lever mechanism 27 is connected by linkage 29 to a switch 31 mounted upon the motor 7 and controls the operation thereof.

A vent pipe 33 is connected to the final separation chamber (to be described) of the separator and opens into a nozzle receptacle 35 in the housing 37.

The separator assembly is mounted on a bracket 39 which is in turn mounted on the pump base 41 in any suitable manner.

In Figures 1 and 2 the suction stub is disclosed as opening into a suction chamber A in which is formed a vertically extending baffle 43. A wall 45 forms with a separating chamber wall 47, a screen chamber B which opens at 49 into chamber A and which is provided with a port 51 which is in communication with the suction chamber C of the pump 5.

An opening 53 is provided in the outer wall of chamber A in alignment with chamber B so that a basket type screen 55 may be inserted in chamber B where it rests with its bottom edge against a supporting shoulder 57. A screw plug 59 closes the opening 53.

The pump 5 comprises a rotor 61, which is driven by the motor and belt, and a plurality of blades 63 movable edgewise in slots in the rotor. Said blades have rolls 65 journalled thereon at each end, which ride in grooves 67. The grooves are eccentric with respect to the rotor, so that the blades will move in and out of the latter, but will remain in contact with the bore 69 so that liquid will be taken into chamber C and forced into chamber D on the discharge side of the pump under pressure.

As the liquid leaves the chamber D, it may follow one of two channels. It may pass through the orifice 71, which opens into the space 73 in the primary separating chamber E or, under certain conditions, it may enter the orifice 75 and return to the suction chamber A.

If we assume that the first mentioned path is followed, the liquid will flow over baffle 77 into chamber E which is of large volume compared to the other chambers A to D, inclusive, and as a result, the velocity of the liquid will be greatly reduced.

Further, the stream of liquid passing from space 73 to the discharge pipe 11 will "break" or be reversed over baffle 77. The element 79 is provided to strengthen the walls of chamber E. A clean out opening 81 is provided in chamber E and provided with a plug 83.

A vent opening 85 is provided in the upper wall of chamber E substantially above the space 73. This opening must be sufficiently large to discharge all of the gas which may be pumped into chamber E at substantially the same rate that it enters. If this were not the case, the chamber E would eventually fill with gases and some of them would reach the meter.

On the other hand the opening must not be so large that it will pass an excess amount of liquid since this would unduly reduce efficiency of the system and would lower the pressure applied to the meter. Usually the orifice is made about three thirty-seconds inch ($\frac{3}{32}''$) in diameter in separators used for dispensing apparatus of the kind here disclosed. Should the separator be used in other apparatus, however, the opening would have to be larger or smaller, depending in part on the amount of gases pumped, the pump pressure, the rate of flow of liquid and other consideration.

The mixture of liquid and gases passing from the restricted orifice 85 is diverted by a hollowed or dished cap 87 through an opening 89 and into the secondary or final separation chamber F, which is connected to the suction chamber A through a valve port 91.

A pair of brackets 93 support, by means of a pivot pin 95, a U-shaped lever 97 which has a long arm 99 and a short arm 101. The arm 101 is perforated to pivotally receive the bent-over end of a valve rod 103 which depends downwardly into chamber F and support a valve 105 adjacent the port 91.

The long arm 99 is bent back upon itself to form a clevis which supports a pivot pin 107 upon which is mounted a stem 109 of a float 111. An angle piece 113 is attached to the float adjacent the valve rod 103 and is perforated to receive the same as shown in Figure 1.

A stop lug 115 depends from the upper wall of the cap and serves to contact the lever 97 to limit the upward motion of the float and valve.

Returning now to Figures 2, 3 and 4, it will be seen that if the nozzle valve is closed while the pump 5 is in operation, pressure will be built up in chamber E, and the motor would very quickly be stalled unless some provision were made to relieve the pressure in chamber E. It is for this reason that the channel through port 75 is provided.

Since the port 75 is in communication with the suction chamber A, the pump would tend to discharge liquid from chamber D to chamber A through port 75 and to pump it from chamber A, through B and into the suction chamber of the pump to again begin its cycle.

However, the port 75 is closed by a poppet type valve which opens into chamber A. This valve has a hub 119 provided with wing guides 121 to maintain it in coaxial relation with the port, with a portion 123 provided with an axial face 125 against which a valve element 127 is held by means of a nut threaded on to a portion 131 of the hub. A shoulder which serves as a spring seat is formed by the junction of this portion 131 and the spring guide 133. The port 75 is provided with a valve seat 135 against which the valve element 127 is urged by spring 137.

An internally threaded opening 139 in boss 141 leads from chamber A to the outside of the separator body and the opening is plugged by a combined plug and spring seat 143 which has a spring guide 147 formed thereon. Washers may be placed against the shoulder 145 to adjust the tension of the spring 137. The tension of the spring, of course, controls the pressure in the chamber D.

Bosses 149 and projecting lugs 151 provide supports for the motor on the separator 3. Preferably, some provision is made as by providing elongated holes in the feet of the motor to permit a slight adjustment of the motor on said supports to vary the distance between centers of the motor shaft and pump shaft to adjust the tension of the belt 9.

*Operation*

When pump 5 is started by the linkage 27, 29, 31 in Figure 4, liquid will be raised from underground reservoir by the suction of the pump and will pass into chamber A over baffle 43, through screen 55 and into chambers B, C and D in succession. If the valve in nozzle 23 is open the liquid will pass through port 71 into space 73 in chamber E, over the baffle 77 and out through pipe 11 on its way to the meter and the other elements in the discharge system.

Since the volume of chamber E is much greater than the chambers A to D, inclusive, a substantial reduction in velocity of the stream of liquid will result when it enters chamber E. Further in passing from port 71 to conduit 11, the flow of liquid "breaks" or is reversed over baffle 77 and this action assists the separation of the gases from the liquid.

The gases which collect in the upper part of chamber E will contain some entrained liquid and the stream of fluid passing through the orifice 85 will therefore be a mixture of gases and liquid. This stream suffers a reversal of direction and a reduction of pressure from pump pressure, which may be from 10 to 20 pounds per square inch above atmosphere, to atmospheric pressure. Also the cross-sectional area of the chamber is great as compared to that of the stream, hence a considerable reduction of velocity is experienced. All of these factors combine to promote the final separation of gases and liquid in chamber F.

Any separated gases pass out the vent 33 to the nozzle receptacle and thence to atmosphere. Under bad conditions some liquid may even be carried up into the vent tube and there be separated from the gas or be passed out to atmosphere.

The liquid which reaches chamber F accumulates until the rising liquid level lifts the float to rotate the lever 97 about its pivot 95 and thus lift the valve 105 to open port 91. Since the pressure in chamber A is sub-atmospheric, liquid will drain down into the chamber A and be recirculated through the pump.

No gases will be permitted to pass through port 91 because the lowering liquid level will cause a downward travel of the float which in turn will close the valve 105 long before the level nears the port 91.

Since the stream of fluid passing through orifice 85 has a fairly high velocity, it causes some turbulence in chamber F. To prevent damage to the float and its linkage and to insure proper operation of the same, the guide member 113 is provided to hold the float in its upright position.

To prevent the valve 105 from being moved out of its seat 92, walls 90 are provided which diverge from the port 91 and which extend sufficiently above the port 91 to prevent the escape of the valve in any position between the upper and lower limits of its travel as established by the seat 92 and the stop lug 115.

If the valve in nozzle 23 is closed to any appreciable extent or entirely, the pressure in chamber D will build up to such an extent that the chamber A being under sub-atmospheric pressure, the spring 137 will be overcome and valve 127 will leave its seat. Thus part or all of the out-put of the pump will be circulated through chambers A, B, C, pump 5 and chamber D until the nozzle valve is again opened or the pump is shut down.

The valve is provided with large guide wings and has no positive connection with any other element except the wings. Thus any tendency of the valve to bind is avoided and chattering of the valve, together with its accompanying noise, will be substantially reduced.

Both the valve 127 and the screen basket are readily accessible from outside of the unit so that they may readily be adjusted, repaired or replaced.

Applicant has disclosed a preferred form of his invention, but it is obvious that various changes may be made in the form, construction and arrangement of parts without departing from the invention as defined by the claims.

What applicant considers to be new and desires to protect by Letters Patent of the United States is:

1. In a separator unit, a separating chamber, means for draining said chamber comprising a valve seat and a valve mounted for lateral and axial motion, means for restricting the lateral motion of said valve and means for limiting the axial motion of said valve to maintain it within the zone of action of said restricting means, said restricting means being formed to guide said valve into position on its seat, a float, means for connecting said float to operate said valve, guide means forming another connection between said float and said valve, so constructed and arranged that lateral movement of said float will be restricted by said first mentioned motion restricting means.

2. In a separating device a separating chamber comprising a bowl, a port at the bottom of said bowl for draining it, a lever mounted at the top of said bowl, a valve depending from said lever and controlling said port, a float depending from said lever, means for preventing undue lateral motion of said valve, and means for loosely connecting said float to be guided by said valve, said connecting means being constructed and arranged to restrain relative lateral movement but to permit relative vertical movement of said float and said valve.

3. In a liquid and gas separating unit, means forming a separating chamber, means, including a valve seat, forming a liquid drain for said chamber, a valve adapted to coact with said seat, a float, means connecting said valve for operation by said float including means for supporting said valve and float for lateral motion, motion restricting means for limiting the lateral movement of said valve and its supporting means, and guide means connecting said float and valve supporting means, constructed and arranged to limit the lateral motion of said float.

CLEMENT P. GRIFFITH.